United States Patent
Tamba et al.

(10) Patent No.: US 12,500,541 B2
(45) Date of Patent: Dec. 16, 2025

(54) ELECTRIC WORKING MACHINE AND METHOD OF CONTROLLING ELECTRIC WORKING MACHINE

(71) Applicant: KUBOTA CORPORATION, Osaka (JP)

(72) Inventors: Daiki Tamba, Osaka (JP); Shinichi Kawabata, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 264 days.

(21) Appl. No.: 18/530,791

(22) Filed: Dec. 6, 2023

(65) Prior Publication Data

US 2024/0223116 A1    Jul. 4, 2024

(30) Foreign Application Priority Data

Dec. 28, 2022   (JP) .................................. 2022-211309

(51) Int. Cl.
*H02P 1/12*       (2006.01)
*B60L 1/00*       (2006.01)
(Continued)

(52) U.S. Cl.
CPC .............. *H02P 27/06* (2013.01); *B60L 1/003* (2013.01); *B60L 1/02* (2013.01); *B60L 50/60* (2019.02);
(Continued)

(58) Field of Classification Search
CPC ....... H02P 27/06; H02J 7/0016; H02J 7/0047; H02J 7/0063; H02J 7/00306; H02J 7/0048
See application file for complete search history.

(56) References Cited

U.S. PATENT DOCUMENTS

| | | |
|---|---|---|
| 2014/0117934 A1 | 5/2014 | Kurikuma et al. |
| 2018/0090797 A1 | 3/2018 | Huff et al. |

(Continued)

FOREIGN PATENT DOCUMENTS

| | | |
|---|---|---|
| JP | 2021-80703 A | 5/2021 |
| WO | 2020/051427 A1 | 3/2020 |

OTHER PUBLICATIONS

European Search Report dated May 23, 2024 issued in European Patent Office (EPO) Patent Application No. 23215395.7, with an English translation thereof.

*Primary Examiner* — Muhammad S Islam
(74) *Attorney, Agent, or Firm* — GREENBLUM & BERNSTEIN, P.L.C.

(57) ABSTRACT

An electric working machine includes battery packs, an actuated device to be actuated by electricity supplied from the battery packs, and a controller to control discharging of the battery packs based on remaining charge levels of the battery packs. The controller is configured/programmed to select one of the battery packs as a discharging battery pack, and perform a limiting process to limit electricity supplied from the discharging battery pack to the actuated device when the remaining charge level of the discharging battery pack is less than a limit threshold, and cause the limit threshold and/or content of the limiting process to differ between when one or more of the battery packs that are other than the discharging battery pack have a remaining charge level of a second threshold or more and when any of such battery packs do not have a remaining charge level of the second threshold or more.

10 Claims, 6 Drawing Sheets

(51) Int. Cl.

| | | |
|---|---|---|
| *B60L 1/02* | (2006.01) | |
| *B60L 50/60* | (2019.01) | |
| *B60L 58/12* | (2019.01) | |
| *B60L 58/22* | (2019.01) | |
| *H02J 7/00* | (2006.01) | |
| *H02P 27/06* | (2006.01) | |

(52) U.S. Cl.
CPC .............. *B60L 58/12* (2019.02); *B60L 58/22* (2019.02); *H02J 7/0016* (2013.01); *H02J 7/0047* (2013.01); *H02J 7/0063* (2013.01); *H02J 7/00712* (2020.01); *B60L 2200/40* (2013.01)

(56) References Cited

U.S. PATENT DOCUMENTS

| | | |
|---|---|---|
| 2019/0194910 A1 | 6/2019 | Takahashi et al. |
| 2021/0091686 A1* | 3/2021 | Ichikawa ............ H01M 10/425 |

* cited by examiner

| | | Limit threshold | Limiting process |
|---|---|---|---|
| First example | First battery pack | 15% | First limiting process (1400rpm) |
| | Second battery pack | 20% | First limiting process (1400rpm) |
| Second example | First battery pack | 15% | First limiting process (1500rpm) |
| | Second battery pack | 15% | First limiting process (1300rpm) |
| Third example | First battery pack | 10% | Ninth limiting process |
| | Second battery pack | 15% | Ninth limiting process, First limiting process (1400rpm) |
| Fourth example | First battery pack | 10% | Ninth limiting process, First limiting process (1500rpm) |
| | Second battery pack | 15% | Ninth limiting process, First limiting process (1300rpm), Second limiting process |
| Fifth example | First battery pack | 15% | Ninth limiting process |
| | Second battery pack | 20% | Ninth limiting process, Third limiting process, Fourth limiting process, Fifth limiting process |
| Sixth example | First battery pack | 15% | Ninth limiting process |
| | Second battery pack | 20% | Ninth limiting process, Sixth limiting process |
| Seventh example | First battery pack | 15% | Ninth limiting process, Eighth limiting process |
| | Second battery pack | 20% | Ninth limiting process, Seventh limiting process, Eighth limiting process |
| Eighth example | First battery pack | 15% | Ninth limiting process |
| | Second battery pack | 20% | Ninth limiting process, Eighth limiting process |

Fig.4

ELECTRIC WORKING MACHINE AND METHOD OF CONTROLLING ELECTRIC WORKING MACHINE

CROSS REFERENCE TO RELATED APPLICATIONS

This application claims the benefit of priority to Japanese Patent Application No. 2022-211309 filed on Dec. 28, 2022. The entire contents of this application are hereby incorporated herein by reference.

BACKGROUND OF THE INVENTION

1. Field of the Invention

The present invention relates to an electric working machine actuated by electricity from a battery and a method of controlling an electric working machine.

2. Description of the Related Art

Japanese Unexamined Patent Application Publication No. 2021-80703 (Patent Literature 1) discloses an electric working machine including: an electric motor; a battery unit that includes a plurality of batteries connected to each other in parallel and supplies electricity to the electric motor; a hydraulic pump that is driven by the electric motor and delivers hydraulic fluid; a hydraulic device that is driven by hydraulic fluid; a working device that is actuated by the hydraulic device; a remaining charge detector that detects the remaining charge level of the plurality of batteries; and a notifier that provides a notification of a decrease in battery level. When the remaining charge level of a battery selected as an output battery decreases below a first threshold, a controller causes the notifier to provide a notification prompting for changing the output battery.

SUMMARY OF THE INVENTION

However, although the notifier provides a prompt for changing the output battery when the remaining charge level of the output battery decreases below the first threshold in the technique of Patent Literature 1, if the output battery is switched to another one when the remaining charge level of all batteries is less than the first threshold, it may be impossible to make full use of the remaining charge of the batteries appropriately.

Preferred embodiments of the present invention provide electric working machines and methods of controlling an electric working machine each of which makes it possible to efficiently use the remaining charge of a plurality of battery packs.

An electric working machine according to an aspect of the present invention includes battery packs, an actuated device to be actuated by electricity supplied from the battery packs, and a controller to control discharging of the battery packs based on a remaining charge level of each of the battery packs, wherein the controller is configured or programmed to select one of the battery packs as a discharging battery pack to supply electricity to the actuated device, and perform a limiting process to limit electricity supplied from the discharging battery pack to the actuated device when the remaining charge level of the discharging battery pack is less than a limit threshold, and cause the limit threshold and/or content of the limiting process to differ between when one or more of the battery packs that are other than the discharging battery pack have a remaining charge level more than or equal to a second threshold and when any of the one or more of the battery packs that are other than the discharging battery pack do not have a remaining charge level more than or equal to the second threshold.

The controller may be configured or programmed to set the limit threshold to a first threshold that is less than the second threshold if one or more of the battery packs that are other than the discharging battery pack have a remaining charge level more than or equal to the second threshold, and set the limit threshold to the second threshold or to a third threshold that is more than the first threshold and less than or equal to the second threshold if any of the one or more of the battery packs that are other than the discharging battery pack do not have a remaining charge level more than or equal to the second threshold.

The controller may be configured or programmed to perform a first process as the limiting process if one or more of the battery packs that are other than the discharging battery pack have a remaining charge level more than or equal to the second threshold, and perform a second process as the limiting process if any of the one or more of the battery packs that are other than the discharging battery pack do not have a remaining charge level more than or equal to the second threshold, the second process being a process to limit electricity supplied from the discharging battery pack to the actuated device to a greater extent than the first process.

The actuated device may include an electric motor. The controller may be configured or programmed to perform the limiting process to limit an upper limit of a rotational speed of the electric motor, and set the upper limit of the rotational speed such that the upper limit is lower in the second process than in the first process.

The actuated device may include a working device and a traveling device. The controller may be configured or programmed to limit driving of the working device and/or the traveling device at least in the second process.

The controller may be configured or programmed to prohibit the driving of the working device and not prohibit the driving of the traveling device in the second process.

The electric working machine may further include an operator's seat on which an operator is to be seated. The actuated device may include an air conditioner to condition air around the operator's seat. The controller may be configured or programed to limit electricity supplied from the discharging battery pack to the air conditioner to a greater extent in the second process than in the first process.

The electric working machine may further include an operation actuator to receive a cancelling operation to cancel the limiting process. The controller may be configured or programmed to cancel the limiting process based on an operation signal indicating the cancelling operation output from the operation actuator.

The electric working machine may further include a selector to be used to select the discharging battery pack. The controller may be configured or programmed to select one of the battery packs as the discharging battery pack based on an operation signal output from the selector.

A method of controlling an electric working machine according to an aspect of the present invention is a method of controlling an electric working machine including battery packs and an actuated device to be actuated by electricity supplied from the battery packs, the method including a first step including detecting a remaining charge level of each of the battery packs, a second step including selecting one of the battery packs as a discharging battery pack to supply electricity to the actuated device, and a third step including performing a limiting process to limit electricity supplied from the discharging battery pack to the actuated device when the remaining charge level of the discharging battery pack of the battery packs is less than a limit threshold, wherein the third step includes causing the limit threshold and/or content of the limiting process to differ between when one or more of the battery packs that are other than the discharging battery pack have a remaining charge level more than or equal to a second threshold and when any of the one or more of the battery packs that are other than the discharging battery pack do not have a remaining charge level more than or equal to the second threshold.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 4 illustrates limit thresholds and content of limiting processes corresponding to a first battery pack and limit thresholds and content of limiting processes corresponding to a second battery pack.

DETAILED DESCRIPTION OF THE PREFERRED EMBODIMENTS

Figure 1:
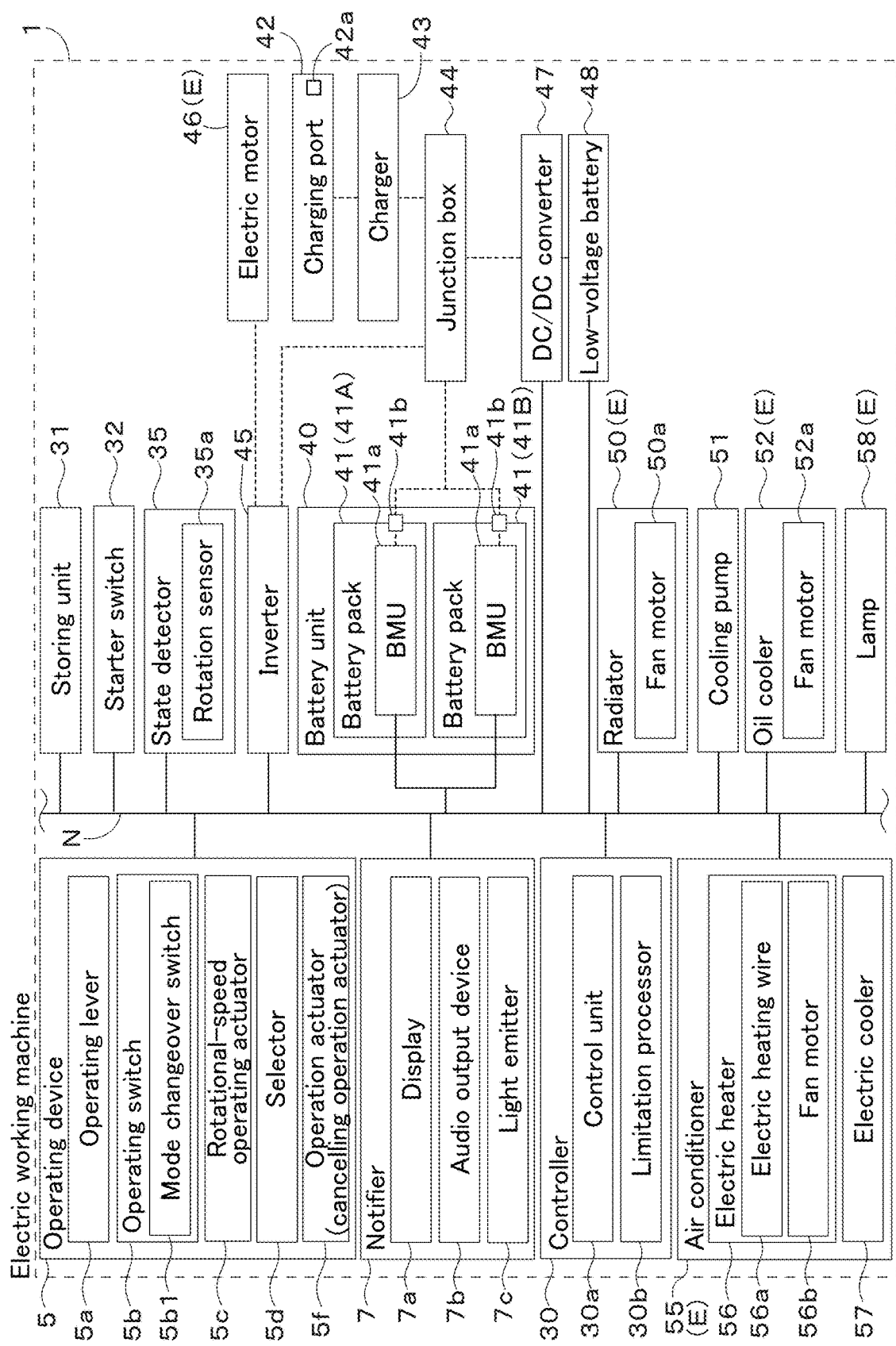
FIG. 1 is an electric block diagram of an electric working machine.

The preferred embodiments will now be described with reference to the accompanying drawings, wherein like reference numerals designate corresponding or identical elements throughout the various drawings. The drawings are to be viewed in an orientation in which the reference numerals are viewed correctly.

Hereafter, embodiments of the present invention will be described with reference to the drawings.

First, a general configuration of an electric working machine 1 will be described.

Figure 6:
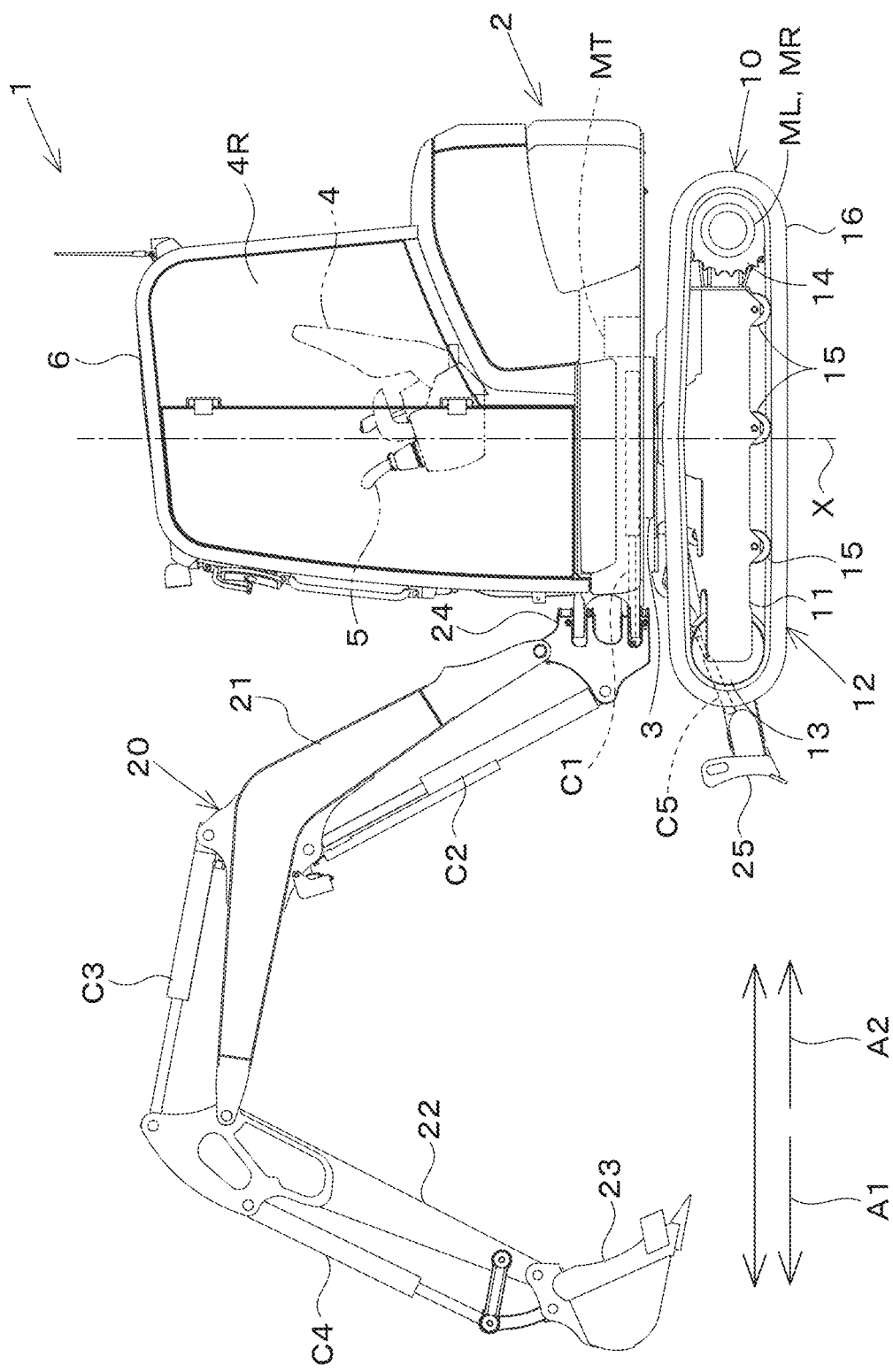
FIG. 6 is a general side view of an electric working machine.

FIG. 6 is a general side view of the electric working machine 1. The electric working machine 1 is a backhoe, and includes a machine body (turn base) 2, a traveling device 10, a working device 20, and the like. An operator's seat 4, on which an operator is to be seated, and a protection mechanism 6, which protects the operator from the front, rear, left, right, and above, are provided on the machine body 2.

In the following description, the term "forward" refers to the direction in which an operator seated on the operator's seat 4 faces (the direction of an arrow A1 in FIG. 6), and the term "rearward" refers to the opposite direction (the direction of an arrow A2 in FIG. 6). The term "leftward" refers to a direction toward the left side of the operator (the front side of the sheet of FIG. 6), the term "rightward" refers a direction toward the right side of the operator (the back side of the sheet of FIG. 6). The term "machine-body-width direction" refers to a horizontal direction that is perpendicular to the forward-rearward direction (machine body forward-rearward direction).

The protection mechanism 6 illustrated in FIG. 6 is of a type (cabin-type) such that the operator's seat 4 is disposed in the protection mechanism 6. However, the type of the protection mechanism 6 is not limited to the cabin-type, may be a type (canopy-type) such that the upper side of the operator's seat 4 is covered by a roof (canopy), or may be a type such that the operator's seat 4 is open in the forward-rearward direction, the machine-body-width direction, and the upward direction. The protection mechanism 6 of the cabin-type separates the space around the operator's seat 4 from the outside. That is, the protection mechanism 6 forms a cabin 4R including the operator's seat 4.

An operating device 5 for operating the electric working machine 1 is provided around the operator's seat 4 in the protection mechanism 6 (the cabin 4R).

The traveling device 10 is a device for causing the machine body 2 to travel, and includes a travel frame (truck frame) 11 and a travel mechanism 12. The travel frame 11 is a structure to whose periphery the travel mechanism 12 is attached and that supports the machine body 2 on an upper portion thereof.

The travel mechanism 12 is, for example, a crawler-type travel mechanism. The travel mechanism 12 is provided on each of the left side and the right side of the travel frame 11. The travel mechanism 12 includes an idler 13, a driving wheel 14, a plurality of rollers 15, an endless crawler belt 16, and travel motors ML and MR.

The idler 13 is disposed on a front portion of the travel frame 11. The driving wheel 14 is disposed on a rear portion of the travel frame 11. The plurality of rollers 15 are disposed between the idler 13 and the driving wheel 14. The crawler belt 16 is looped over the idler 13, the driving wheel 14, and the rollers 15.

The left travel motor ML is included in the travel mechanism 12 on the left side of the travel frame 11. The right travel motor MR is included in the travel mechanism 12 on the right side of the travel frame 11. These travel motors ML and MR include hydraulic motors. In each travel mechanism 12, the driving wheel 14 rotates by using the power from the travel motor ML or MR and causes the crawler belt 16 to circulate in the circumferential direction.

The machine body 2 is supported on the travel frame 11 via a turn bearing 3 so that the machine body 2 can turn about a turn axis X. A turn motor MT is provided in the machine body 2. The turn motor MT includes a hydraulic motor (hydraulic actuator). The machine body 2 turns about the turn axis X by using the power from the turn motor MT.

The working device 20 is supported on a front portion of the machine body 2. The working device 20 includes a boom 21, an arm 22, a bucket (working tool) 23, a dozer device 25, and hydraulic cylinders (hydraulic actuators) C1 to C5. A proximal-end portion of the boom 21 is rotatably attached to a swing bracket 24 so that the boom 21 can rotate about a horizontal axis (axis extending in the width direction of the machine body 2). Therefore, the boom 21 is swingable in the upward and downward direction (in the vertical direction). The arm 22 is attached to a distal-end portion of the boom 21 so that the arm 22 can rotate about a horizontal axis. Therefore, the arm 22 is swingable in the forward-rearward direction or upward-downward direction. The bucket 23 is provided on a distal end portion of the arm 22 so that that bucket 23 can perform shoveling and dumping.

To the electric working machine 1, it is possible to attach another working tool (hydraulic attachment) that can be driven by a hydraulic actuator, instead of or in addition to the bucket 23. Examples of the other working tool include a hydraulic breaker, a hydraulic crusher, an angle broom, an earth auger, a pallet fork, a sweeper, a mower, a snow blower, and the like.

The swing bracket 24 swings leftward and rightward as a swing cylinder C1, which is provided in the machine body 2, extends and contracts. The boom 21 swings upward and downward (forward and rearward) as a boom cylinder C2 extends and contracts. The arm 22 swings upward and downward (forward and rearward) as an arm cylinder C3 extends and contracts. The bucket 23 performs shoveling and dumping as a bucket cylinder (working tool cylinder) C4 extends and contracts. The swing cylinder C1, the boom cylinder C2, the arm cylinder C3, and the bucket cylinder C4 include hydraulic cylinders (hydraulic actuators).

The dozer device 25 is attached to a front portion of the traveling device 10. The dozer device 25 swings upward and downward as a dozer cylinder C5 extends and contracts. The dozer cylinder C5 is attached to the travel frame 11. The dozer cylinder C5 includes a hydraulic cylinder (hydraulic actuator).

The electric working machine 1 performs traveling by using the traveling device 10, which includes the travel motors ML and MR; and performs working by using the working device 20, which includes the hydraulic cylinders C1 to C5, and the turn motor MT. That is, it can be said the turn motor MT is the working device 20 with which the electric working machine 1 performs working. In the following description, the travel motors ML and MR may be referred to as travelling-system hydraulic actuators, and the hydraulic cylinders C1 to C5 and the turn motor MT may be referred to as working-system hydraulic actuators.

Next, the electric configuration of the electric working machine 1 will be described. FIG. 1 is an electric block diagram of the electric working machine 1. As illustrated in FIG. 1, the electric working machine 1 includes a controller 30, a storing unit (storage and/or memory) 31, a battery unit 40, a charging port 42, a charger 43, a junction box 44, an inverter 45, an electric motor 46, a DC/DC converter 47, and a low-voltage battery 48.

The controller 30 is provided in the machine body 2 or the protection mechanism 6 and includes electric/electronic circuit(s), CPU(s), program(s) stored in a memory or the like, and/or the like. The controller 30 controls various devices connected to an on-vehicle network N included in the electric working machine 1. The controller 30 controls the action of each portion of the electric working machine 1 illustrated in FIG. 1.

For example, the controller 30 can perform control of discharging (discharging control) in which the battery unit 40 supplies (discharges) electricity to each element of the electric working machine 1 and control of charging (charging control) of the battery unit 40. The controller 30 can be switched between a discharging mode in which electricity is supplied to actuated device(s) E (for example, the electric motor 46 and/or the like described below) actuated by electricity and a charging mode in which the battery unit 40 is charged, and performs the discharging control in the discharging mode and performs the charging control in the charging mode.

At least one or more of operation members of the operating device 5 of the electric working machine 1 are communicably connected to the controller 30. The controller 30 controls the action of each portion of the electric working machine 1 based on an operation signal output from the operating device 5. As illustrated in FIG. 1, the operating device 5 includes operating lever(s) 5a and an operating switch 5b as operation members connected to the controller 30. The operating lever 5a and the operating switch 5b are operable by an operator seated on the operator's seat 4. Although FIG. 1 illustrates each of the operating lever 5a and the operating switch 5b as one block for convenience, in practice, the operating lever 5a includes a plurality of levers and the operating switch 5b includes a plurality of switches.

As illustrated in FIG. 1, the operating switch 5b includes a mode changeover switch 5b1. The mode changeover switch 5b1 is a switch for inputting an instruction of switching between the discharging mode and the charging mode of the controller 30.

A starter switch 32 is connected to the controller 30. The starter switch 32 is provided in the protection mechanism 6 and is operable by an operator seated on the operator's seat 4. The starter switch 32 is operated to start and stop the electric working machine 1. The controller starts each portion of the electric working machine 1 in response to an on-operation of the starter switch 32 and stops each portion of the electric working machine 1 in response to an off-operation of the starter switch 32.

As illustrated in FIG. 1, a state detector 35 that detects the state of the electric working machine 1 is connected the controller 30. The state detector 35 outputs the detected state of the electric working machine 1 to the controller 30 as a detection signal. The state detector 35 includes, for example, a rotation sensor 35a. The rotation sensor 35a is a sensor that detects the rotational speed of the electric motor 46, and the controller 30 computes the rotational speed of the electric motor 46 based on a detection signal input from the rotation sensor 35a.

The storing unit 31 is a storage medium such as a solid-state drive (SSD) or a hard disk drive (HDD), and stores various information related to the electric working machine 1.

The battery unit 40 is a structure that can store electricity and discharges (outputs) the stored electricity. The battery unit 40 includes a plurality of battery packs 41. The battery packs 41 have the same specifications (the same discharge capacity and the like). In the example illustrated in FIG. 1, for example, two battery packs 41 are provided in the battery unit 40. The number of the battery packs 41 included in the battery unit 40 is not limited to two, and may be three or more. The discharge capacities of the plurality of battery packs 41 need not be the same.

The plurality of battery packs 41 supply electricity to actuated device(s) E. Each battery pack 41 is a secondary battery (storage battery), such as lithium-ion battery, including at least one battery. In a case that each battery pack 41 includes a plurality of batteries, the plurality of batteries are electrically connected in series and/or in parallel (at least one of in series or in parallel). Each battery included in each battery pack 41 includes a plurality of cells, and the plurality of cells are connected in series and/or in parallel. The plurality of battery packs 41 have a discharge capacity that allows each element of the electric working machine 1 to operate for a predetermined period of time. The plurality of battery packs 41 are connected in parallel to each other.

In each of the plurality of battery packs 41, a battery management unit (BMU, battery monitor) 41a is provided. Each BMU 41a is provided inside a corresponding battery pack 41. Each BMU 41a may be contained in a corresponding battery pack 41, or may be provided outside the battery pack 41.

Each BMU 41a controls a corresponding battery pack 41. The BMU 41a controls the start and stop of supply of electricity from the battery pack 41 by controlling the opening and closing of a relay included in the battery pack 41. Each BMU 41a detects (monitors) the status of a corresponding battery pack 41. The BMU 41a detects the temperature, voltage, electric current, terminal voltage across internal cell(s), and/or the like of the battery pack 41.

Moreover, the BMU 41a detects the remaining charge level (charge rate) of the battery pack 41 based on, for example, the terminal voltage across cell(s) in the battery pack 41 using a voltage measurement method. In the present embodiment, the BMU 41a detects the remaining charge level of the battery pack 41 in percentage.

The method of detecting the remaining charge level of the battery pack 41 is not limited to the voltage measure method, and may be another method such as coulomb counting, battery cell modeling, or impedance tracking. A remaining charge detector that detects the remaining charge level of the battery pack 41 may be provided independently of the BMU 41a.

The charging port 42 includes a connector (not shown) to which a charging cable (not shown) is to be fitted, and a connection detector (connection detection sensor) 42a. To the charging port 42, an external power source (commercial power source or the like) is connected via the charging cable.

The charging port 42 may be provided with the connection detector 42a which detects whether or not an external power source is connected, instead of or in addition to the mode changeover switch 5b1 included in the operating device 5. The connection detector 42a includes a sensor or the like that detects that a charging cable is fitted to the charging port 42 and an external power source is connected. Therefore, the controller 30 enters the charging mode when the connection detector 42a detects that a charging cable is connected to the charging port 42, and enters the discharging mode when the connection detector 42a detects that a charging cable is not connected to the charging port 42.

The controller 30 need not be switched between the discharging mode and the charging mode via the mode changeover switch 5b1 and/or the connection detector 42a. As another example, for example, the controller 30 may enter the discharging mode when a turn-on operation (an operation to start the electric working machine 1) is performed on the starter switch 32 and may enter the charging mode when the turn-on operation is not performed. The controller 30 may enter the discharging mode or the charging mode based on the operating state of the operating lever 5a and/or the operating switch 5b for operation of the traveling device 10 and/or the working device 20.

The charger 43 is electrically connected to the charging port 42 and the junction box 44, converts three-phase AC electricity having been supplied from the external power source via the charging cable and the charging port 42 into DC electricity, and supplies the DC electricity to the junction box 44. The charger 43 includes a rectifier (not shown) that converts three-phase AC electricity into DC electricity, and an electronic circuit (not shown) that regulates the electric current and the voltage of DC electricity to be supplied to the junction box 44. The electronic circuit includes, for example, switching element(s), diode(s), resistor(s), electrolytic capacitor(s), and/or the like.

The junction box 44 is electrically connected to the battery unit 40, the charger 43, the inverter 45, and the DC/DC converter 47. The junction box 44 outputs, to the battery unit 40, electricity having been input from the charger 43. The junction box 44 outputs electricity having been output from the battery unit 40 to the inverter 45 and the DC/DC converter 47.

The inverter 45 is electrically connected to the electric motor 46 and the junction box 44, converts DC electricity having been input from the battery unit 40 via the junction box 44 into three-phase AC electricity, and supplies the three-phase AC electricity to the electric motor 46. The inverter 45 can desirably adjust the frequency and the voltage of the electricity to be supplied to the electric motor 46.

The electric motor 46 is supplied with electricity from the battery pack(s) 41, is driven by the supplied electricity, and generates power. The electric motor 46 is electrically connected to the inverter 45, and is driven by electricity supplied from the battery unit 40 (the battery pack(s) 41) via the inverter 45. The electric motor 46 is a drive for the electric working machine 1, and includes, for example, a permanent magnet embedded three-phase AC synchronous motor. The electric motor 46 includes a rotatable rotor and a stator that generates a force to rotate the rotor.

The rotational speed of the electric motor 46 is controlled using a rotational speed operating actuator 5c, which is included in the operating device 5. As illustrated in FIG. 1, the rotational speed operating actuator 5c is connected to the controller 30, and outputs an operation signal to the controller 30. The rotational speed operating actuator 5c is, for example, a dial switch having a plurality of switching positions, such as a selector switch, and target values of the rotational speed of the electric motor 46 are allotted to the plurality of switching positions. The rotational speed operating actuator 5c can be operated to set the range of the target value of the rotational speed of the electric motor 46 to the range of 1500 to 2600 rpm.

The controller 30 transmits a command signal to the inverter 45 in accordance with the operation signal output from the rotational speed operating actuator 5c. The inverter 45 adjusts the frequency and the voltage of the electricity to be supplied to the electric motor 46 in accordance with the command signal output from the controller 30, and changes the motor rotational speed of the electric motor 46.

Note that the electric motor 46 may be a synchronous motor of another type, an AC motor, or a DC motor. The rotational speed of the electric motor 46 need not be controlled via the rotational speed operating actuator 5c, and may be controlled via another member of the operating device 5. For example, the rotational speed of the electric motor 46 may be controlled based on a preset table in accordance with the operation amount of the operating device 5.

The DC/DC converter 47 is a voltage converter that converts the voltage of DC electricity having been input from the battery unit 40 via the junction box 44 into a different voltage. In the present embodiment, the DC/DC converter 47 is a step-down converter that converts the high voltage of the battery unit 40 into a predetermined low voltage that is suitable for electric/electronic components included in the electric working machine 1. The DC/DC converter 47 supplies electricity to the low-voltage battery 48 after converting the voltage. The electric/electronic component(s) is/are the actuated device(s) E actuated by electricity supplied from the battery unit 40 via the DC/DC converter 47 and the low-voltage battery 48. The electric/electronic components include, for example, the controller 30, a fan motor 50a of a radiator 50, a fan motor 52a of an oil cooler 52, an air conditioner 55, and lamps 58 (room lamp(s), work lamp(s), headlight(s), signal light(s), light(s) of manual operator(s), and the like).

The low-voltage battery 48 is a lower voltage storage battery than the battery unit 40. The low-voltage battery 48 is charged with electricity supplied from the DC/DC converter 47. The low-voltage battery 48 supplies electricity to electric/electronic components in or on the electric working machine 1.

The controller 30 acquires each state detected by the battery monitor 41a, and controls charging and discharging of the battery pack 41 based on the state(s). The controller 30 selects and change a discharging battery pack that supplies electricity to the actuated device(s) E in the discharging mode, and a charging battery pack that is charged in the charging mode. As illustrated in FIG. 1, the controller 30 includes a control unit 30a that performs discharging control and charging control. The control unit 30a includes CPU(s), program(s) stored in a memory or the like, and/or the like.

The control unit 30a selects and changes a discharging battery pack in the discharging mode and a charging battery pack in the charging mode, by switching the state of connection switchers included in the electric working machine 1 between a connected state and a disconnected state. Each connection switcher includes (i) a connection switch 41b included in the battery pack 41 and (ii) the junction box 44. The connection switch 41b includes, for example, a relay or a switch and/or the like, and can be switched between a connected state and a disconnected state.

In the discharging mode, the control unit 30a selects one of the plurality of battery packs 41 as a discharging battery pack, and switches the discharging battery pack to another battery pack 41. In the discharging mode, the control unit 30a switches one of the connection switches 41b to the connected state, and switches the other of the connection switches 41b to the disconnected state. Thus, the control unit 30a causes electricity to be output from one of the plurality of battery packs 41 to the junction box 44, and stops output of electricity from the other of the battery packs 41. The control unit 30a controls the junction box 44 to connect the inverter and/or the DC/DC converter 47 to each battery pack 41 and to disconnect the charger 43 (the charging port 42) from each battery pack 41.

In the charging mode, the control unit 30a selects one of the plurality of battery packs 41 as a charging battery pack to be charged, and switches the charging battery pack to another battery pack 41. In the charging mode, the control unit 30a switches one of the connection switches 41b to the connected state, and switches the other of connection switches 41b to the disconnected state. The control unit 30a controls the junction box 44 to disconnect the inverter and/or the DC/DC converter 47 from each battery pack 41 and to connect the charger 43 (the charging port 42) to each battery pack 41. Thus, the control unit 30a causes electricity from the junction box 44 to be output to one of the plurality of battery packs 41, and stops input of electricity to the other of the battery packs 41.

In this way, the control unit 30a controls input and stopping input of electricity into the plurality of battery packs 41.

Hereafter, the radiator 50, the oil cooler 52, and the air conditioner 55 will be described as examples of electric/electronic components or devices including the electric/electronic components supplied with electricity from the low-voltage battery 48.

The radiator 50 cools coolant to cool high-heat-generating electric equipment such as the battery unit 40, the inverter 45, the electric motor 46, and the DC/DC converter 47. The high-heat-generating equipment is electric equipment that generates more heat by operating on electricity than other electrical equipment included in the electric working machine 1. The coolant is not water alone but is a liquid that does not freeze even in cold weather, for example.

The radiator 50 includes the fan motor 50a, and a radiator fan (not shown) and a heat exchanger (not shown) that are rotated and driven by power from the fan motor 50a. The fan motor 50a is driven by electricity supplied from the low-voltage battery 48.

A cooling pump 51 is provided, together with the radiator 50 and the high-heat-generating electric equipment, in a coolant passage (not shown) in the machine body 2. The cooling pump 51 allows coolant to be discharged into and circulate through the coolant passage.

The oil cooler 52 cools hydraulic fluid having passed through hydraulic devices such as the hydraulic actuators ML, MR, MT, and C1 to C5 described above and hydraulic pumps P1 and P2 and a control valve unit V described below. The oil cooler 52 includes the fan motor 52a, and an oil cooler fan (not shown) rotated and driven by power from the fan motor 52a and a heat exchanger (not shown). The fan motor 52a is driven by electricity from the low-voltage battery 48.

The air conditioner 55 is actuated by electricity from the low-voltage battery 48 and conditions air around the operator's seat 4 (the cabin 4R). The air conditioner 55 can perform at least one of heating or cooling of the cabin 4R. In the present embodiment, the air conditioner 55 includes an electric heater 56 that performs heating and an electric cooler 57 that performs cooling.

The electric heater 56 is actuated by electricity from the low-voltage battery 48, and heats the interior of the protection mechanism 6. The electric heater 56 is, for example, an electrical heater. The electric heater 56 includes electric heating wire(s) 56a, a fan motor 56b, and a heating fan (not shown). The electric heating wire 56a generates high heat when energized. The fan motor 56b rotates and drives the heating fan. The heating fan blows ambient air heated by the electric heating wire 56a toward the interior of the protection mechanism 6. The fan motor 56b is driven by electricity from the low-voltage battery 48.

The electric cooler 57 is driven by electricity from the low-voltage battery 48, and cools the interior of the protection mechanism 6. The electric cooler 57 is, for example, an air conditioner.

Figure 2:
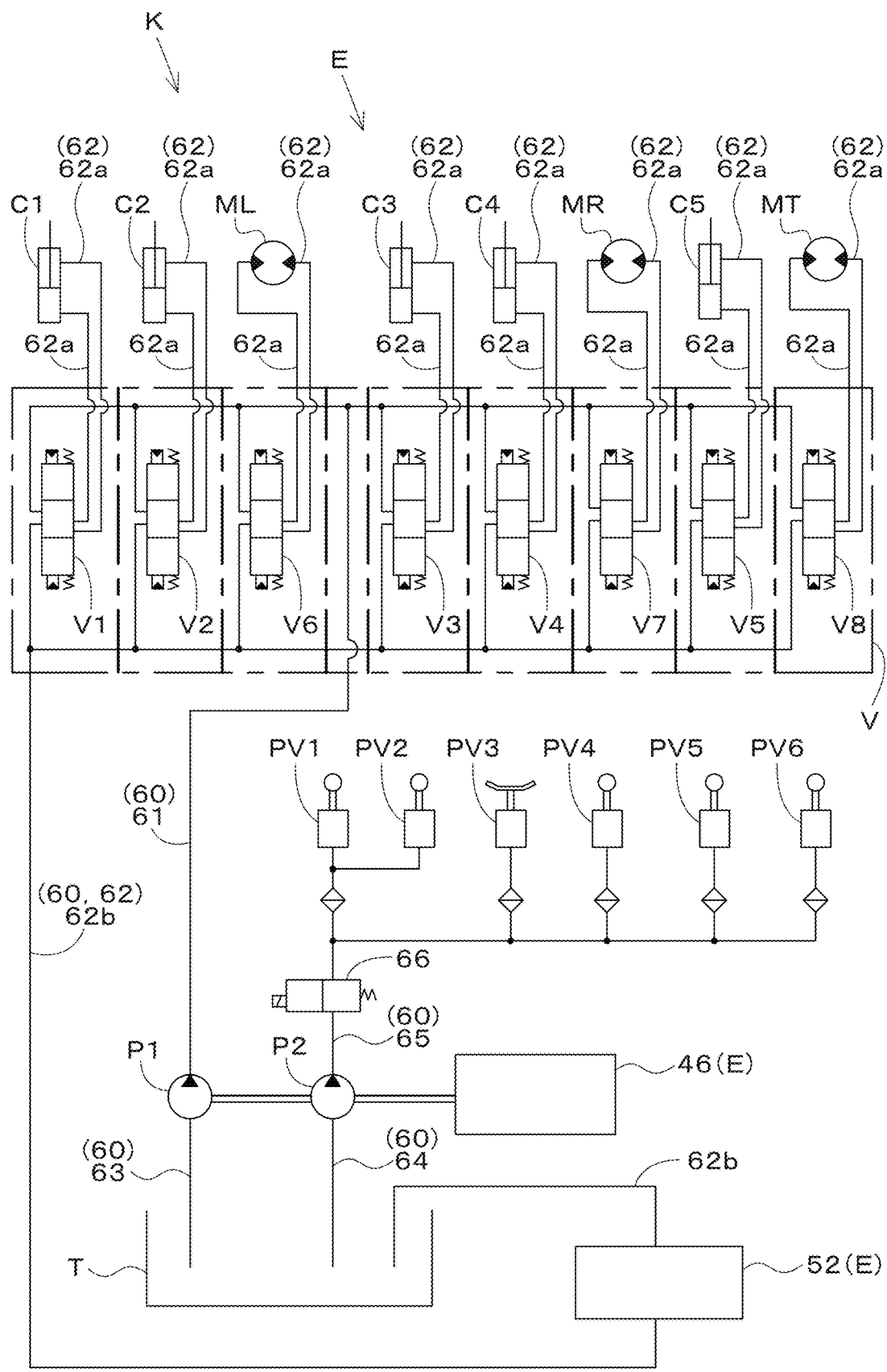
FIG. 2 is a hydraulic circuit diagram of the electric working machine.

Next, a hydraulic circuit K of the electric working machine 1 will be described. FIG. 2 is a hydraulic circuit diagram of the electric working machine 1. As illustrated in FIG. 2, the hydraulic circuit K includes hydraulic devices such as the hydraulic actuators C1 to C5, ML, MR, and MT, the control valve unit V, the hydraulic pumps P1 and P2, a hydraulic fluid tank T, the oil cooler 52, operating valves PV1 to PV6, an unloading valve 66, and a fluid passage 60, and/or the like.

One of the plurality of the hydraulic pumps P1 and P2 is a hydraulic pump P1 for actuation, and the other is a hydraulic pump P2 for control. These hydraulic pumps P1 and P2 are driven by power from the electric motor 46.

The hydraulic pump P1 for actuation suctions hydraulic fluid stored in the hydraulic fluid tank T, and delivers the hydraulic fluid to the control valve unit V. For convenience, FIG. 2 illustrates one hydraulic pump P1 for actuation. However, this does not imply any limitation, and the number of the hydraulic pumps P1 for actuation may be selected as appropriate to allow hydraulic fluid to be supplied to the hydraulic actuators C1 to C5, ML, MR, and MT.

The hydraulic pump P2 for control outputs a hydraulic pressure for signaling, controlling, and/or the like by delivering hydraulic fluid from the hydraulic fluid tank T. That is, the hydraulic pump P2 for control supplies (delivers) pilot fluid. The number of the hydraulic pumps P2 for control may also be selected appropriately.

The control valve unit V includes a plurality of control valves V1 to V8. The control valves V1 to V8 control (adjust) the flow rate of hydraulic fluid output from the hydraulic pumps P1 and P2 to the hydraulic actuators C1 to C5, ML, MR, and MT. The swing control valve V1 controls the flow rate of hydraulic fluid supplied to the swing cylinder C1. The boom control valve V2 controls the flow rate of hydraulic fluid supplied to the boom cylinder C2. The arm control valve V3 controls the flow rate of hydraulic fluid supplied to the arm cylinder C3. The bucket control valve V4 controls the flow rate of hydraulic fluid supplied to the bucket cylinder C4. The dozer control valve V5 controls the flow rate of hydraulic fluid supplied to the dozer cylinder C5. The left travel control valve V6 controls the flow rate of hydraulic fluid supplied to the left travel motor ML. The right travel control valve V7 controls the flow rate of hydraulic fluid supplied to the right travel motor MR. The turn control valve V8 controls the flow rate of hydraulic fluid supplied to the turn motor MT.

The operating valves PV1 to PV6 are actuated according to the operation of the operating lever(s) 5a of the operating device 5. In proportion to the amount by which the operating valve(s) PV1 to PV6 is/are actuated (operation amount of the operating valves PV1 to PV6), pilot fluid acts on the control valve(s) V1 to V8, thus moving the spool(s) of the control valve(s) V1 to V8. Then, hydraulic fluid in an amount proportional to the amount by which the spool(s) of the control valve(s) V1 to V8 is/are moved is supplied to the to-be-controlled hydraulic actuator(s) C1 to C5, ML, MR, and/or MT. Furthermore, the hydraulic actuator(s) C1 to C5, ML, MR, and/or MT is/are driven according to the supply amount of hydraulic fluid from the control valve(s) V1 to V8.

In other words, hydraulic fluid (pilot fluid) that acts on the control valve(s) V1 to V8 is adjusted by operating the operating lever(s) 5a, so that the control valve(s) V1 to V8 is/are controlled. With this, the amount of hydraulic fluid supplied from the control valve(s) V1 to V8 to the hydraulic actuator(s) C1 to C5, ML, MR, and/or MT is adjusted, so that the driving and stopping of the hydraulic actuator(s) C1 to C5, ML, MR, and MT are controlled.

The fluid passage 60 is a flow path that connects elements in the hydraulic circuit K and allows hydraulic fluid or pilot fluid to flow to the element(s). The fluid passage 60 includes a first fluid passage 61, a second fluid passage 62, a first suction fluid passage 63, a second suction fluid passage 64, and a restriction fluid passage 65.

The first suction fluid passage 63 is a flow path to allow hydraulic fluid suctioned from the hydraulic fluid tank T by the hydraulic pump P1 for actuation to flow therein. The second suction fluid passage 64 is a flow path to allow hydraulic fluid suctioned from the hydraulic fluid tank T by the hydraulic pump P2 for control to flow therein.

The first fluid passage 61 is a flow path to allow hydraulic fluid delivered by the hydraulic pump P1 for actuation to flow toward the control valves V1 to V8 of the control valve unit V. The first fluid passage 61 branches into multiple branches in the control valve unit V and connected to the control valves V1 to V8.

The second fluid passage 62 includes flow path(es) to allow hydraulic fluid having passed through the control valves V1 to V8 to flow toward the hydraulic fluid tank T. The hydraulic fluid tank T stores hydraulic fluid. The second fluid passage 62 includes shuttle fluid passage(s) 62a and a drain passage 62b.

A plurality of the shuttle fluid passages 62a are provided such that each of the control valves V1 to V8 is connected to a corresponding one of the to-be-controlled hydraulic actuators C1 to C5, ML, MR, and MT by a pair of the shuttle fluid passages 62a. Each shuttle fluid passage 62a is a flow path to supply hydraulic fluid from a connected one of the control valves V1 to V8 to a connected one of the hydraulic actuators C1 to C5, ML, MR, and MT, and return hydraulic fluid from the one of the hydraulic actuators C1 to C5, ML, MR, and MT back to the one of the control valves V1 to V8. One end of the drain passage 62b branches into multiple branches and connected to the control valves V1 to V8. The other end of the drain passage 62b is connected to the hydraulic fluid tank T.

A portion of hydraulic fluid having flowed through the first fluid passage 61 to one of the control valves V1 to V8 passes through the one of the control valves V1 to V8 to one of the shuttle fluid passages 62a, and is supplied to a to-be-controlled one of the hydraulic actuators C1 to C5, ML, MR, and MT. Then, hydraulic fluid discharged from the one of the hydraulic actuators C1 to C5, ML, MR, and MT flows through the other of the shuttle fluid passages 62a back to the connected one of the control valves V1 to V8, passes through the one of the control valves V1 to V8, and flows to the drain passage 62b.

The other portion of the hydraulic fluid having flowed through the first fluid passage 61 to one of the control valves V1 to V8 flows through the one of the control valves V1 to V8 to the drain passage 62b without being supplied to the hydraulic actuators C1 to C5, ML, MR, or MT. The drain passage 62b is provided with the oil cooler 52. The oil cooler 52 cools hydraulic fluid having flowed from any of the control valves V1 to V8 through the drain passage 62b.

The hydraulic fluid cooled by the oil cooler 52 returns to the hydraulic fluid tank T through the drain passage 62b. As mentioned above, the fluid passages 61, 62, and 63 are arranged to allow hydraulic fluid to circulate through the hydraulic fluid tank T, the hydraulic pump P1, and the control valves V1 to V8 of the control valve unit V (a portion of hydraulic fluid circulates also through the hydraulic actuators C1 to C5, ML, MR, and MT).

The restriction fluid passage 65 is a flow path to allow hydraulic fluid delivered by the hydraulic pump P2 for control to flow to the operating valves PV1 to PV6. One end of the restriction fluid passage 65 is connected to the hydraulic pump P2 for control, and the other end branches into multiple branches and connected to the ports on the primary side (primary ports) of the operating valves PV1 to PV6.

The restriction fluid passage 65 is provided with the unloading valve 66. The unloading valve 66 prohibits the drive of the hydraulic actuators C1 to C5, ML, MR, and MT, i.e., the drive of the traveling device 10 and the working device 20, by cutting off the supply of hydraulic fluid from the hydraulic pump P1 for actuation to the hydraulic actuators C to C5, ML, MR, and MT.

The unloading valve 66 is switched between a supply position and a blocking position in accordance with a command signal from the controller 30. The controller 30 switches between de-energization and energization of the unloading valve 66 based on an operation signal output from an unloading lever (not shown) included in the operating lever 5*a*. The unloading valve 66 is biased by a spring in a direction to be switched to the blocking position (unloading position) and thus is switched to the blocking position when the solenoid is deenergized, and is switched to the supply position when the solenoid is energized. The unloading valve 66 is energized when the unloading lever is in a lowered position, and is deenergized when the unloading lever is in a raised position.

Once the unloading valve 66 has switched to the supply position, hydraulic fluid delivered by the hydraulic pump P2 for control into the restriction fluid passage 65 is supplied to the operating valves PV1 to PV6, allowing the operation of the control valves V1 to V8. This also allows the operation of the hydraulic actuators C1 to C5, ML, MR, and MT, the traveling device 10, and the working device 20. The hydraulic fluid discharged from the operating valves PV1 to PV6 returns to the hydraulic fluid tank T through another drain passage (not shown).

On the contrary, once the unloading valve 66 has switched to the blocking position, hydraulic fluid having been delivered by the hydraulic pump P2 for control into the restriction fluid passage 65 is drained to the hydraulic fluid tank T, and is no longer supplied (stops being supplied) to the operating valves PV1 to PV6, and the operation of the control valves V1 to V8 is prohibited. With this, the operation of the hydraulic actuators C1 to C5, ML, MR, and MT, the working device 20, and the traveling device 10 is also prohibited.

Note that, in the embodiment described above, the electric motor 46 is driven by electricity supplied from the battery pack(s) 41, the hydraulic pumps P1 and P2 are driven by power from the electric motor 46, the hydraulic actuators C1 to C5, ML, MR, and MT are driven by hydraulic fluid delivered by the hydraulic pumps P1 and P2, and the traveling device 10 and the working device 20 are driven by power from hydraulic actuators C1 to C5, ML, MR, and MT. However, this does not imply any limitation. For example, one or more or all of the actuators of traveling device 10 and the working device 20 may be electric actuator(s), the electric actuator(s) may be driven by electricity from the battery pack(s) 41, and the traveling device 10 and the working device 20 may be driven by power from the electric actuator(s), provided that the traveling device 10 and the working device 20 are driven by electricity supplied from the battery pack(s) 41.

Hereafter, discharging control included in the method of controlling the electric working machine 1 will be described in detail.

The control unit 30*a* (the controller 30) performs the discharging control in which the control unit 30*a* selects a discharging battery pack in accordance with an operation of a selector 5*d*. The selector 5*d* is an operation member (manual operator) to receive an operation to select one of the plurality of battery packs 41. In the present embodiment, the selector 5*d* is provided in a meter panel that displays the state of the electric working machine 1 (for example, the rotational speed of the electric motor 46, the remaining charge level of the battery pack(s) 41). The meter panel is a display 7*a*, and includes a display screen that is a liquid crystal panel, a touch panel, or some other panel. The meter panel can graphically display the state of the electric working machine 1, and the selector 5*d* is graphics displayed on the display screen. The display 7*a* is communicably connected to the controller 30, and an operation signal from the selector 5*d* is output to the controller 30 (control unit 30*a*). The control unit 30*a* selects one of the plurality of battery packs 41 as a discharging battery pack based on the operation signal output from the selector 5*d*.

In the discharging mode, the controller 30 acquires the remaining charge level of each of the plurality of battery packs 41 detected by the BMUs 41*a*, and performs discharging control based on the remaining charge levels. The controller 30 performs, as discharging control, a limiting process to limit supply of electricity from the discharging battery pack to the actuated device(s) E, when the remaining charge level of the discharging battery pack is less than a limit threshold. The actuated device E includes the electric motor 46 supplied with electricity from the discharging battery pack. The actuated device E need only be device(s) actuated by electricity supplied from the battery pack(s) 41. The actuated device E may include device(s) (for example, the traveling device 10 and the working device 20) driven by power generated by the electric motor 46 which is supplied with electricity from the battery pack(s) 41. The actuated device E may include device(s) (for example, the radiator 50, the oil cooler 52, the air conditioner 55, and/or the various lamps 58) actuated by electricity supplied from the low-voltage battery 48 supplied with electricity from the battery pack(s) 41.

As illustrated in FIG. 1, the controller 30 includes a limitation processor 30*b*. The limitation processor 30*b* acquires the remaining charge level of the discharging battery pack from the BMU 41*a*, and determines whether or not the remaining charge level is less than a limit threshold. When it is determined that the remaining charge level of the discharging battery pack is less than the limit threshold, the limitation processor 30*b* performs a predetermined limiting process. The limitation processor 30*b* includes CPU(s), program(s) stored in a memory or the like, and/or the like. The limiting process performed by the limitation processor 30*b* is a process to limit consumption of electricity output from the discharging battery pack to the actuated device E.

The limitation processor 30*b* causes the limit threshold and/or content of the limiting process (at least one of the limit threshold or the content of the limiting process) to differ between when one or more of the battery packs 41 that are other than the discharging battery pack have a remaining charge level more than or equal to a second threshold and when any of the one or more of the battery packs 41 that are other than the discharging battery pack do not have a remaining charge level more than or equal to the second threshold. To be specific, the limitation processor 30*b* sets the limit threshold to a first threshold when one or more of the battery packs 41 that are other than the discharging battery pack have a remaining charge level more than or equal to a second threshold, and sets the limit threshold to the second threshold or a third threshold when any of the one or more of the battery packs 41 that are other than the discharging battery pack do not have a remaining charge level more than or equal to the second threshold. The first threshold, the second threshold, and the third threshold are, for example, predetermined values stored beforehand in the storing unit 31.

The following description discusses an example case where the limitation processor 30*b* sets the limit threshold to the third threshold when any of the one or more of the battery packs 41 that are other than the discharging battery pack do not have a remaining charge level more than or equal to the second threshold.

The first threshold is less than the second threshold. The first threshold is defined such that the remaining charge level is close to zero. The second threshold is more than the first threshold. The third threshold is more than the first threshold and less than or equal to the second threshold. In the present embodiment, the first threshold is defined to be 15%, and the second threshold is defined to be 20%. The third threshold is also defined to be 20%.

Therefore, when one or more of the battery packs 41 that are other than the discharging battery pack have a remaining charge level more than or equal to the second threshold, it is possible to use the remaining charge more than when any of the one or more of the battery packs 41 that are other than the discharging battery pack do not have a remaining charge level more than or equal to the second threshold, by an amount corresponding to the difference between the first threshold and the third threshold (or the second threshold). When any of the one or more of the battery packs 41 that are other than the discharging battery pack do not have a remaining charge level more than or equal to the second threshold, the electric working machine 1 performs the limiting process when a relatively large charge still remains, and therefore it is possible to eliminate or reduce the likelihood that the battery packs 41 will suddenly go dead and the electric working machine 1 will suddenly stop.

The first threshold, the second threshold, and the third threshold need only be set at least such that the third threshold is more than the first threshold and the third threshold is less than or equal to the second threshold (first threshold<third threshold≤second threshold), and the first threshold, the second threshold, and the third threshold are not limited to the values described above. The third threshold may be varied in accordance with the number of one or more of the battery packs 41 that are other than the discharging battery pack and that have a remaining charge level more than or equal to the second threshold. In such a case, the limitation processor 30b reduces the third threshold as the number of such battery packs 41 having a remaining charge level more than or equal to the second threshold decreases.

The first threshold, the second threshold, and the third threshold may each be changed to any value by operating an input device (for example, the display 7a or the like, not shown) that is connected to the controller 30 and receives input of information. For the purpose of suppressing chattering, the first threshold, the second threshold, and the third threshold may each be defined in a range of predetermined values including an upper limit and a lower limit.

The following discusses a case where the limitation processor 30b causes the content of the limiting process to differ between when one or more of the battery packs 41 that are other than the discharging battery pack have a remaining charge level more than or equal to the second threshold and when any of the one or more of the battery packs 41 that are other than the discharging battery pack do not have a remaining charge level more than or equal to the second threshold. The limitation processor 30b performs, as the limiting process, a predetermined first process, when one or more of the battery packs 41 that are other than the discharging battery pack have a remaining charge level more than or equal to the second threshold. On the contrary, the limitation processor 30b performs a second process to limit electricity supplied from the discharging battery pack to the actuated device E to a greater degree than in the first process, when any of the one or more of the battery packs 41 that are other than the discharging battery pack do not have a remaining charge level more than or equal to the second threshold.

For example, the limiting process includes a process (first limiting process) to limit the upper limit of the rotational speed (maximum rotational speed) of the actuated device E (electric motor 46) when the remaining charge level of the discharging battery pack is less than the limit threshold. The limitation processor 30b calculates the rotational speed of the electric motor 46 based on a detection signal acquired from the rotation sensor 35a. Moreover, the limitation processor 30b corrects a command signal output to the inverter 45, and limits the rotational speed of the electric motor 46 to a value less than the maximum rotational speed, irrespective of an operation signal output from the rotational speed operating actuator 5c.

The limitation processor 30b (controller 30) sets the upper limit of the rotational speed in the second process (second maximum rotational speed) such that the second maximum rotational speed is lower than the upper limit of the rotational speed in the first process (first maximum rotational speed) (i.e., second maximum rotational speed<first maximum rotational speed). The first maximum rotational speed is defined as, for example, 1500 rpm, and the second maximum rotational speed is defined as, for example, 1300 rpm.

The maximum rotational speed is not limited to the values described above, and may be changed to any value by operating an input device to update a table stored in the storing unit 31.

The limitation processor 30b need only set the second maximum rotational speed such that the second maximum rotational speed is lower than the first maximum rotational speed. The limitation processor 30b may vary the first maximum rotational speed in accordance with the number of battery packs 41 having a remaining charge level more than or equal to the second threshold. In such a case, the limitation processor 30b reduces the first maximum rotational speed as the number of battery packs 41 having a remaining charge level more than or equal to the second threshold decreases.

The limiting process need only be a process to limit electricity supplied from the discharging battery pack to the actuated device E. The limiting process is not limited to the first limiting process to limit the maximum rotational speed of the electric motor 46, and the limitation processor 30b may perform, as the first process and the second process, another limiting process in addition to or instead of the first limiting process. Hereafter, limiting processes other than the first limiting process will be described briefly.

Note that, in the first limiting process described above, a case in which the maximum rotational speed of the electric motor 46 is limited, that is, a case in which electricity supplied to the electric motor 46 is limited, is described. However, the limitation processor 30b may perform, as second to eighth limiting processes described below, a process to prohibit the actuation of the actuated device E by shutting off supply of electricity to the actuated device E in addition to the process to limit electricity supplied to the actuated device E.

When the limitation processor 30b performs a process to prohibit the actuation of the actuated device E in the first process or the second process, the limitation processor 30b combines a plurality of limiting processes, thus limiting electricity supplied from the discharging battery pack to the actuated device E in both the first process and the second process and limiting the electricity to a greater extent in the second process than in the first process. Moreover, the limitation processor 30b may perform a process to prohibit the actuation of one or more actuated devices E (for example, eighth limiting process described later) in the first process, and may perform a process to prohibit the actuation of another actuated device(s) E in addition to the one or more actuated devices E prohibited from being actuated in the first process (for example, seventh limiting process described later) in the second process.

For example, the limitation processor 30b may limit electricity supplied from the discharging battery pack to the air conditioner 55 in the second process to a greater degree than in the first process (second limiting process). The limitation processor 30b performs, as the limiting process, a process to limit the heating output or cooling output of the actuated device E (air conditioner 55) such that the output is less than a predetermined level, when the remaining charge level of the discharging battery pack is less than the limit threshold. In the second limiting process, the limitation processor 30b limits the heating output or cooling output of the air conditioner 55 such that the output is less than a predetermined level, by limiting the heating output and/or cooling output (at least one of heating output or cooling output) or by shutting off the supply of electricity to the air conditioner 55.

The limitation processor 30b may perform, as the limiting process, a process to limit the upper limit of the rotational speed of an actuated device E (fan motor 50a) such that the upper limit is lower than a predetermined level (third limiting process), when the remaining charge level of the discharging battery pack is less than the limit threshold. In the third limiting process, compared to when the third limiting process is not performed, the limitation processor 30b reduces the upper limit of the rotational speed of the fan motor 50a or limits the rotational speed the fan motor 50a to zero by shutting off the supply of electricity to the fan motor 50a.

The limitation processor 30b may perform, as the limiting process, a process to limit the upper limit of the rotational speed of an actuated device E (fan motor 52a) such that the upper limit is lower than a predetermined level (fourth limiting process), when the remaining charge level of the discharging battery pack is less than the limit threshold. In the fourth limiting process, compared to when the fourth limiting process is not performed, the limitation processor 30b reduces the upper limit of the rotational speed of the fan motor 52a or limits the rotational speed the fan motor 52a to zero by shutting off the supply of electricity to the fan motor 52a.

The limitation processor 30b may perform, as the limiting process, a process to limit the output of an actuated device E (lamp 58) such that the output is lower than a predetermined level (fifth limiting process), when the remaining charge level of the discharging battery pack is less than the limit threshold. In the fifth limiting process, the limitation processor 30b limits electricity supplied from the low-voltage battery 48 to the lamp 58 to decrease the illuminance of the lamp 58 or to turn off the lamp 58.

The limitation processor 30b may perform, as the limiting process, a process to limit driving of actuated device(s) E (traveling device 10 and working device 20) (sixth limiting process), when the remaining charge level of the discharging battery pack is less than the limit threshold. In the sixth limiting process, the limitation processor 30b switches the unloading valve 66 to the blocking position to limit driving of the traveling device 10 and the working device 20.

Figure 3:
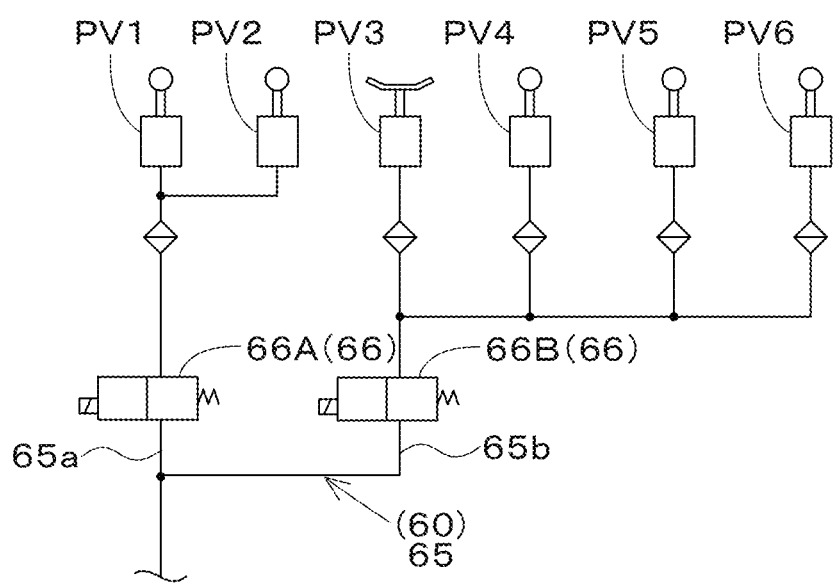
FIG. 3 is a hydraulic circuit diagram of an electric working machine according to a variation.

The sixth limiting process described above is a limiting process to limit the driving of the working device 20 and the traveling device 10. However, for example, at least in the second process, the limitation processor 30b may be capable of limiting the driving of the working device 20 and/or the traveling device 10 (at least one of the working device 20 or the traveling device 10), and may perform a process to limit the driving of either the working device 20 or the traveling device 10. In such a case, as shown in a variation illustrated in FIG. 3, the restriction fluid passage 65 branches into multiple branches in a downstream portion thereof and a plurality of the unloading valves 66 are provided in the downstream portion, and the limitation processor 30b performs, as the limiting process, a process to limit the driving of the traveling device 10 and the driving of the working device 20 independently of each other. FIG. 3 is a hydraulic circuit diagram of the electric working machine 1 according to the variation.

First, the restriction fluid passage 65 and the unloading valves 66 according to the variation will be described. As illustrated in FIG. 3, in the variation, the restriction fluid passage 65 branches into multiple branches in a downstream portion thereof, includes a first portion 65a connected to the operating valves PV1 and PV2 and a second portion 65b connected to the operating valves PV3 to PV6, is provided with a first unloading valve 66A at the first portion 65a, and is provided with a second unloading valve 66B at the second portion 65b.

When the first unloading valve 66A is switched to the supply position, hydraulic fluid is supplied to the operating valves PV1 and PV2, allowing the operation of the traveling device 10. On the contrary, when the first unloading valve 66A is switched to the blocking position, hydraulic fluid is stopped from being supplied to the operating valves PV1 and PV2, thus prohibiting the operation of hydraulic actuators of the travel system. Therefore, by changing the switching position of the first unloading valve 66A, it is possible to switch between the prohibition and permission of driving of the traveling device 10.

When the second unloading valve 66B is switched to the supply position, hydraulic fluid is supplied to the operating valves PV3 to PV6, allowing the operation of hydraulic actuators of the working system. On the contrary, when the second unloading valve 66B is switched to the blocking position, hydraulic fluid is stopped from being supplied to the operating valves PV3 to PV6, thus prohibiting the operation of the hydraulic actuators of the working system. Therefore, by changing the switching position of the second unloading valve 66B, it is possible to switch between the prohibition and permission of driving of the working device 20.

Next, a limiting process according to the variation will be described. In the variation, the limitation processor 30b performs, as the limiting process, a process to limit driving of an actuated device E (traveling device 10) (seventh limiting process), when the remaining charge level of the discharging battery pack is less than the limit threshold. In the seventh limiting process, the limitation processor 30b switches the first unloading valve 66A to the blocking position to limit the driving of the traveling device 10.

The limitation processor 30b performs, as the limiting process, a process to limit driving of an actuated device E (working device 20) (eighth limiting process), when the remaining charge level of the discharging battery pack is less than the limit threshold. In the eighth limiting process, the limitation processor 30b switches the second unloading valve 66B to the blocking position to limit the driving of the working device 20.

In the variation, when the limitation processor 30b performs the sixth limiting process, the limitation processor 30b switches both of the first unloading valve 66A and the second unloading valve 66B to the blocking position to limit the driving of the traveling device 10 and the working device 20.

In the sixth to eighth limiting processes, the limitation processor 30b need only limit the driving of at least the traveling device 10 and/or the working device 20, and the limitation method is not limited to the methods described above. For example, in a case that the operating valves PV1 to PV6 include solenoid valves that change the opening in accordance with a command signal from the controller 30 and the controller 30 outputs the command signal to the operating valves PV1 to PV6 based on an operation signal input from an operation member (for example, operating lever 5a) and on a predetermined table of correspondence between operation signal(s) and command signal(s), the limitation processor 30b may limit the driving of the traveling device 10 and/or the working device 20 by correcting the command signal based on the operation signal and the table such that the opening of the operating valves PV1 to PV6 decreases.

As described above, although the first to eighth limiting processes are each a process to limit electricity itself supplied to the actuated device(s) E, the limitation processor 30b need only be capable of limiting electricity supplied from the discharging battery pack to the actuated device(s) E to a greater degree in the second process than in the first process. Therefore, in the first process, the limitation processor 30b may perform a limiting process to provide a notification (alert notification) indicating that the remaining charge level of the discharging battery pack is low (ninth limiting process) to limit electricity supplied from the discharging battery pack to the actuated device E, without performing a process such as the first to eighth limiting processes. The limitation processor 30b may perform, as the first process, the ninth limiting process together with the first to the eighth limiting process(es).

As illustrated in FIG. 1, the electric working machine 1 includes a notifier 7 to provide a notification. As the first process, the limitation processor 30b causes the notifier 7 to provide an alert notification, and, as the second process, in addition to or instead of the notification, the limitation processor 30b performs a process to limit electricity supplied from the discharging battery pack to the actuated device E (for example, the first to eighth limiting process(es)). For example, in a case that two battery packs 41 are provided in the battery unit 40 as illustrated in FIG. 1, one battery pack 41A is the discharging battery pack, and when the other battery pack 41B is switched to the discharging battery pack instead of the battery pack 41A, the limitation processor 30b may cause the notifier 7 to provide an alert notification without limiting the maximum rotational speed of the electric motor 46 as the first process, and may perform the first limiting process as the second process. In such a case, the maximum rotational speed corresponding to the second process of the other battery pack 41B is defined as 1400 rpm.

The notifier 7 provides a notification of alert information to an operator and/or an administrator in accordance with a command output from the limitation processor 30b. The notifier 7 is communicably connected to the controller 30 and controlled by the controller 30. The notifier 7 provides a notification of a decrease in the remaining charge level of the discharging battery pack as alert information to an operator in the electric working machine 1 using sound, light, graphics, or a combination thereof. The notifier 7 is at least one of the display 7a, an audio output device 7b, or a light emitter 7c. To be specific, in a case that the notifier 7 provides a notification of the remaining charge level of the discharging battery pack using an image/graphics, the notifier 7 is the display 7a such as a monitor that is provided in the electric working machine 1 and displays images/graphics.

In a case that the notifier 7 provides a notification of the remaining charge level of the battery pack 41 using a sound, the notifier 7 is the audio output device (speaker) 7b that provides the notification using a sound and/or a voice. Note that the notifier 7 need only be capable of providing a notification of the remaining charge level of the battery pack 41 to an operator and/or an administrator. The notifier 7 may be the light emitter (indicator) 7c that is provided in the vicinity of the operator's seat 4 and includes a plurality of light sources (for example, LED bulbs), and is at least one of the display 7a, the audio output device 7b, or the light emitter 7c.

The following describes the limit threshold and the content of a limiting process when one or more of the battery packs 41 that are other than the discharging battery pack have a remaining charge level more than or equal to the second threshold and when any of the one or more of the battery packs 41 that are other than the discharging battery pack do not have a remaining charge level more than or equal to the second threshold. Note that, in FIG. 4, the discharging battery pack when one or more of the battery packs 41 that are other than the discharging battery pack have a remaining charge level more than or equal to the second threshold (for example, 20%) is referred to as a first battery pack, and the discharging battery pack when any of the one or more of the battery packs 41 that are other than the discharging battery pack do not have a remaining charge level more than or equal to the second threshold is referred to as a second battery pack. FIG. 4 illustrates limit thresholds and the content of the limiting process corresponding to the first battery pack and limit thresholds and the content of the limiting process corresponding to the second battery pack.

In a first example illustrated in FIG. 4, the limitation processor 30b causes the limit threshold to differ between the first and second battery packs and does not cause the content of the limiting process to differ between the first and second battery packs. The limitation processor 30b in the first example performs a limiting process with regard to the first battery pack, when the remaining charge level of the first battery pack is less than the first threshold (15%). The limitation processor 30b performs a limiting process with regard to the second battery pack, when the remaining charge level of the second battery pack is less than the third threshold (20%). The limitation processor 30b in the first example performs the first limiting process in which the maximum rotational speed is 1400 rpm, with regard to both the first battery pack and the second battery pack.

In a second example illustrated in FIG. 4, the limitation processor 30b causes the limit threshold to be the same between the first and second battery packs and causes the content of the limiting process to differ between the first and second battery packs. The limitation processor 30b in the second example performs, with regard to the first battery pack, the first limiting process in which the first maximum rotational speed is 1500 rpm as the first process, when the remaining charge level of the first battery pack is less than the limit threshold (15%). The limitation processor 30b performs, with regard to the second battery pack, the first limiting process in which the second maximum rotational speed is 1300 rpm as the second process, when the remaining charge level of the second battery pack is less than the limit threshold (15%).

In a third example illustrated in FIG. 4, the limitation processor 30b causes the limit threshold to differ between the first and second battery packs and causes the content of the limiting process to differ between the first and second battery packs. The limitation processor 30*b* in the third example performs, with regard to the first battery pack, the ninth limiting process to provide an alert notification as the first process, when the remaining charge level of the first battery pack is less than the first threshold (10%). The limitation processor 30*b* performs, with regard to the second battery pack, the ninth limiting process to provide an alert notification and the first limiting process in which the maximum rotational speed is 1400 rpm as the second process, when the remaining charge level of the second battery pack is less than the third threshold (15%).

In a fourth example illustrated in FIG. 4, the limitation processor 30*b* causes the limit threshold to differ between the first and second battery packs and causes the content of the limiting process to differ between first and second battery packs. The limitation processor 30*b* in the fourth example performs, with regard to the first battery pack, the ninth limiting process to provide an alert notification and the first limiting process in which the first maximum rotational speed is 1500 rpm as the first process, when the remaining charge level of the first battery pack is less than the first threshold (10%). The limitation processor 30*b* performs, with regard to the second battery pack, the ninth limiting process to provide an alert notification, the first limiting process in which the maximum rotational speed is 1300 rpm, and the second limiting process to shut off the supply of electricity to the air conditioner 55 to prohibit driving of the air conditioner 55 as the second process, when the remaining charge level of the second battery pack is less than the third threshold (15%).

In a fifth example illustrated in FIG. 4, the limitation processor 30*b* causes the limit threshold to differ between the first and second battery packs and causes the content of the limiting process to differ between the first and second battery packs. The limitation processor 30*b* in the fifth example performs, with regard to the first battery pack, the ninth limiting process to provide an alert notification as the first process, when the remaining charge level of the first battery pack is less than the first threshold (15%). The limitation processor 30*b* performs, with regard to the second battery pack, (i) the ninth limiting process to provide an alert notification, (ii) the third limiting process to prohibit driving of the fan motor 50*a*, (iii) the fourth limiting process to prohibit driving of the fan motor 52*a*, and (iv) the fifth limiting process to prohibit the lamp 58 from being turned on by shutting off the supply of electricity to the fan motor 50*a*, the fan motor 52*a*, and the lamp 58, as the second process, when the remaining charge level of the second battery pack is less than the third threshold (20%).

In a sixth example illustrated in FIG. 4, the limitation processor 30*b* causes the limit threshold to differ between the first and second battery packs and causes the content of the limiting process to differ between the first and second battery packs. The limitation processor 30*b* in the sixth example performs, with regard to the first battery pack, the ninth limiting process to provide an alert notification as the first process, when the remaining charge level of the first battery pack is less than the first threshold (15%). The limitation processor 30*b* performs, with regard to the second battery pack, the ninth limiting process to provide an alert notification and the sixth limiting process to prohibit driving of the traveling device 10 and the working device 20 as the second process, when the remaining charge level of the second battery pack is less than the third threshold (20%).

In a seventh example illustrated in FIG. 4, the limitation processor 30*b* causes the limit threshold to differ between the first and second battery packs and causes the content of the limiting process to differ between the first and second battery packs. The limitation processor 30*b* in the seventh example performs, with regard to the first battery pack, the ninth limiting process to provide an alert notification and the eighth limiting process to limit driving of the working device 20 as the first process, when the remaining charge level of the first battery pack is less than the first threshold (15%). The limitation processor 30*b* performs, with regard to the second battery pack, the ninth limiting process to provide an alert notification, the seventh limiting process to limit driving of the traveling device 10, and the eighth limiting process to prohibit driving of the working device 20 as the second process, when the remaining charge level of the second battery pack is less than the third threshold (20%).

In an eighth example illustrated in FIG. 4, the limitation processor 30*b* causes the limit threshold to differ between the first and second battery packs and causes the content of the limiting process to differ between the first and second battery packs. The limitation processor 30*b* in the eighth example performs, with regard to the first battery pack, the ninth limiting process to provide an alert notification as the first process, when the remaining charge level of the first battery pack is less than the first threshold (15%). The limitation processor 30*b* performs, with regard to the second battery pack, the ninth limiting process to provide an alert notification and the eighth limiting process to prohibit driving of the working device 20 as the second process, when the remaining charge level of the second battery pack is less than the third threshold (20%). That is, in the eighth example, the limitation processor 30*b* prohibits driving of the working device 20 and does not prohibit driving of the traveling device 10 in the second process.

The limit threshold and the content of the limiting process corresponding to the first battery pack and the limit threshold and the content of the limiting process corresponding to the second battery pack described above are mere examples, and another combination may be used. For example, in the fifth example illustrated in FIG. 4, the limitation processor 30*b* performs the ninth limiting process as the first process, and performs the ninth limiting process, the third limiting process, the fourth limiting process, and fifth limiting process as the second process. However, the limitation processor 30*b* may perform the ninth limiting process and the first limiting process as the first process, and may perform the ninth limiting process, the first limiting process, the third limiting process, the fourth limiting process, and the fifth limiting process as the second process.

As illustrated in FIG. 1, the electric working machine 1 may include an operation actuator 5*f* (cancelling operation actuator 5*f*) that receives a cancelling operation to cancel the limiting process, and the controller 30 (limitation processor 30*b*) may cancel the limiting process even if the remaining charge level of the discharging battery pack is less than the limit threshold, based on an operation signal that is output from the cancelling operation actuator 5*f* and that indicates the cancelling operation. The cancelling operation actuator 5*f* is included in the operating device 5, and is an image/graphics displayed on the display 7*a*, a push-button switch that can be switched between a first position in which the cancelling operation actuator 5*f* is operated and a second position in which the cancelling operation actuator 5*f* is not operated, or the like.

Note that the cancelling operation actuator 5*f* need only receive at least an operation to cancel (disable) the limiting process and an operation to enable the limiting process. The cancelling operation actuator 5*f* may be configured to receive a cancelling operation to cancel a control process when pressed and held down and to receive an operation to enable the control process when pressed for a short period of time. An operation method thereof and the type of operation member (operation actuator) are not limited to a push-button switch.

The limitation processor 30*b* acquires an operation signal output from the cancelling operation actuator 5*f* to the controller 30, and determines whether or not the cancelling operation actuator 5*f* is operated. The limitation processor 30*b* does not perform the first process or the second process when the limitation processor 30*b* determines that the remaining charge level of the battery pack 41 is less than the limit threshold and the cancelling operation actuator 5*f* is operated, and the limitation processor 30*b* performs the first process and the second process when the limitation processor 30*b* determines that the remaining charge level of the battery pack 41 is less than the limit threshold and the cancelling operation actuator 5*f* is not operated.

Figure 5:
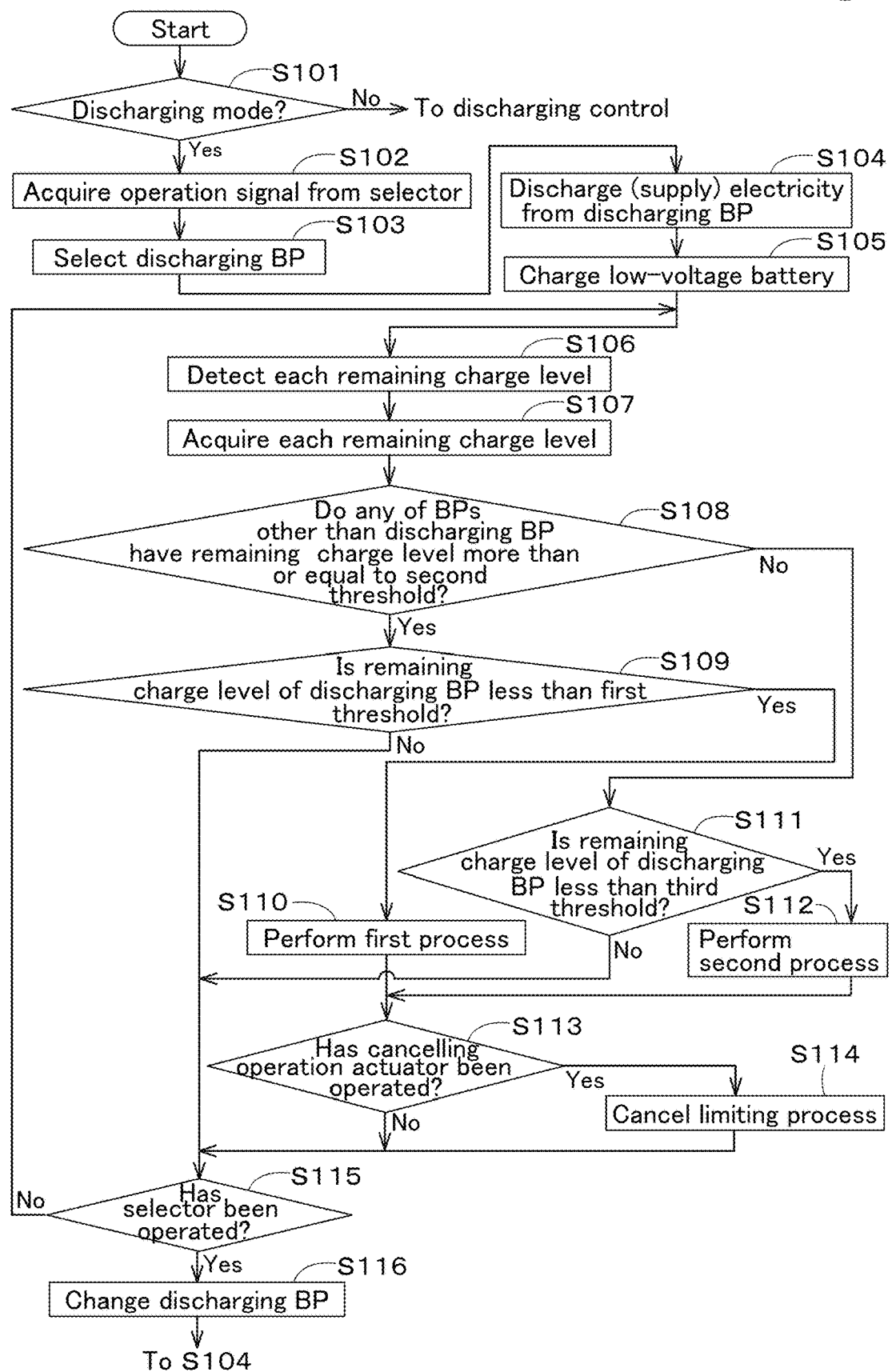
FIG. 5 illustrates a flow of discharging control performed by a controller.

The following describes, with reference to FIG. 5, the flow of discharging control included in a method of controlling the electric working machine 1 according to the present embodiment. FIG. 5 illustrates the flow of discharging control performed by the controller 30. The process shown in FIG. 5 is performed by CPU(s) based on software program(s) stored beforehand in a memory of the controller 30. In FIG. 5, the battery pack 41 is represented as "BP" and the discharging battery pack is represented as "discharging BP" for convenience.

First, the control unit 30*a* determines whether the current mode of the controller 30 is the discharging mode or the charging mode (S101). The control unit 30*a* determines whether the current mode of the controller 30 is the discharging mode or the charging mode in accordance with whether or not a charging cable is connected the charging port 42 or in accordance with the switched state of the mode changeover switch 5*b*1 which is used by an operator to switch between the discharging mode and the charging mode.

If the control unit 30*a* determines that the current mode of the controller 30 is the charging mode (S101: No), the control unit 30*a* performs a charging process (detailed description of the flow of a charging process is omitted).

On the contrary, if the control unit 30*a* determines that the current mode of the controller 30 is the discharging mode (S101: Yes), the control unit 30*a* acquires an operation signal output from the selector 5*d* to the controller 30 (S102). The control unit 30*a* selects a discharging battery pack from the plurality of battery packs 41 in accordance with the operation signal acquired from the selector 5*d* (S103, second step).

Once the control unit 30*a* has selected a discharging battery pack from the plurality of battery packs 41 (S103), the control unit 30*a* controls the connection switch 41*b* and the junction box 44 to supply (discharge) electricity of the discharging battery pack to the inverter 45 and the DC/DC converter 47 (S104). The controller 30 controls the DC/DC converter 47 to supply electricity from the DC/DC converter 47 to the low-voltage battery 48, and charges the low-voltage battery 48 as necessary (S105).

Next, the BMU 41*a* detects the state (remaining charge level) of each of the battery packs 41 (S106, first step), and the limitation processor 30*b* acquires the remaining charge level of each of the battery packs 41 (S107). The limitation processor 30*b* determines whether or not any of one or more of the battery packs 41 that are other than the discharging battery pack have a remaining charge level more than or equal to the second threshold (S108).

If it is determined that one or more of the battery packs 41 that are other than the discharging battery pack have a remaining charge level more than or equal to the second threshold (S108: Yes), the limitation processor 30*b* determines whether or not the remaining charge level of the discharging battery pack is less than a limit threshold (first threshold) (S109).

If it is determined that the remaining charge level of the discharging battery pack is less than the first threshold (S109: Yes), the limitation processor 30*b* performs the first process (for example, one or more of the first to ninth limiting process) (S110). If it is determined that the remaining charge level of the discharging battery pack is not less than the first threshold (S109: No), the limitation processor 30*b* does not perform any limiting process, and the control unit 30*a* proceeds to step S115 described below.

On the contrary, if it is determined that any of the one or more of the battery packs 41 that are other than the discharging battery pack do not have a remaining charge level more than or equal to the second threshold (S108: No), the limitation processor 30*b* determines whether or not the remaining charge level of the discharging battery pack is less than a limit threshold (the third threshold in the present embodiment) (S111).

If it is determined that the remaining charge level of the discharging battery pack is less than the third threshold (S111: Yes), the limitation processor 30*b* performs the second process (for example, one or more of the first to ninth limiting process) (S112). If it is determined that the remaining charge level of the discharging battery pack is not less than the third threshold (S111: No), the limitation processor 30*b* does not perform any limiting process, and the control unit 30*a* performs step S115 described below.

If the first process is performed in S110 or the second process is performed in S112, the limitation processor 30*b* acquires an operation signal output from the cancelling operation actuator 5*f* to the controller 30, and determines whether the cancelling operation actuator 5*f* is operated based on the acquired operation signal (S113). If it is determined that the cancelling operation actuator 5*f* is operated (S113: Yes), the limitation processor 30*b* cancels (disables) the limiting process (S114). When the limiting process is canceled (disabled) by the limitation processor 30*b* (S114), the control unit 30*a* proceeds to step S115. If it is determined that the cancelling operation actuator 5*f* is not operated (S113: No), the limitation processor 30*b* does not cancel the limiting process and keeps the limiting process effective, and the control unit 30*a* performs step S115.

In S115, the control unit 30*a* acquires an operation signal output from the selector 5*d* to the controller 30, and determines whether the selector 5*d* is operated (S115).

If it is determined that the selector 5*d* is operated (S115: Yes) in accordance with the operation signal acquired from the selector 5*d*, the control unit 30*a* switches the discharging battery pack to another one of the plurality of battery packs 41 in accordance with the acquired operation signal of the selector 5*d* (S116), and proceeds to step S104. If it is determined that the selector 5*d* is not operated in accordance with the operation signal acquired from the selector 5*d* (S115: No), the control unit 30*a* proceeds to step S106.

A "third step" refers to, as in S110 and S112 described above, the process to perform the limiting process to limit electricity supplied from the discharging battery pack to the actuated device(s) E when the remaining charge level of the discharging battery pack of the plurality of battery packs 41 is less than the limit threshold.

The flowchart of discharging control of the electric working machine 1 illustrated in FIG. 5 is an example, and is not limited to the flow described above. For example, in FIG. 5, the control unit 30*a* selects a discharging battery pack after determining whether the current mode is the discharging mode or the charging mode. However, conversely, the control unit 30*a* may determine whether the current mode is the discharging mode or the charging mode after selecting a discharging battery pack.

In the present embodiment, it is assumed that the discharge capacities of the battery packs 41 are the same. However, this does not imply any limitation, and the discharge capacities of the battery pack 41 may differ from each other. In the present embodiment, the first to third thresholds and the limit threshold are set as the ratio of the remaining charge level to the power of the fully charged battery pack 41. However, this does not imply any limitation, and these thresholds may be set using the value of the remaining charge level as-is.

Preferred embodiments of the present invention provide electric working machines 1 and methods of controlling an electric working machine 1 described in the following items.

(Item 1) An electric working machine 1 including battery packs 41, an actuated device E to be actuated by electricity supplied from the battery packs 41, and a controller 30 to control discharging of the battery packs 41 based on a remaining charge level of each of the battery packs 41, wherein the controller 30 is configured or programmed to select one of the battery packs 41 as a discharging battery pack to supply electricity to the actuated device E, and perform a limiting process to limit electricity supplied from the discharging battery pack to the actuated device E when the remaining charge level of the discharging battery pack is less than a limit threshold, and cause the limit threshold and/or content of the limiting process to differ between when one or more of the battery packs 41 that are other than the discharging battery pack have a remaining charge level more than or equal to a second threshold and when any of the one or more of the battery packs 41 that are other than the discharging battery pack do not have a remaining charge level more than or equal to the second threshold.

(Item 2) A method of controlling an electric working machine 1 including battery packs 41 and an actuated device E to be actuated by electricity supplied from the battery packs 41, the method including a first step including detecting a remaining charge level of each of the battery packs 41, a second step including selecting one of the battery packs 41 as a discharging battery pack to supply electricity to the actuated device E, and a third step including performing a limiting process to limit electricity supplied from the discharging battery pack to the actuated device E when the remaining charge level of the discharging battery pack of the battery packs 41 is less than a limit threshold, wherein the third step includes causing the limit threshold and/or content of the limiting process to differ between when one or more of the battery packs 41 that are other than the discharging battery pack have a remaining charge level more than or equal to a second threshold and when any of the one or more of the battery packs 41 that are other than the discharging battery pack do not have a remaining charge level more than or equal to the second threshold.

With the electric working machine 1 according to item 1 and the method of controlling an electric working machine 1 according to item 2, it is possible to use the remaining charge of the battery packs 41 appropriately both when one or more of the battery packs 41 that are other than the discharging battery pack have a remaining charge level more than or equal to a second threshold and when any of the one or more of the battery packs 41 that are other than the discharging battery pack do not have a remaining charge level more than or equal to the second threshold, while limiting electricity supplied to the actuated device E according to the remaining charge levels of the battery packs 41.

(Item 3) The electric working machine 1 according to item 1, wherein the controller 30 is configured or programmed to set the limit threshold to a first threshold that is less than the second threshold if one or more of the battery packs 41 that are other than the discharging battery pack have a remaining charge level more than or equal to the second threshold, and set the limit threshold to the second threshold or to a third threshold that is more than the first threshold and less than or equal to the second threshold if any of the one or more of the battery packs 41 that are other than the discharging battery pack do not have a remaining charge level more than or equal to the second threshold.

With the electric working machine 1 according to item 3, when there is/are battery pack(s) 41 having a remaining charge level more than or equal to the second threshold, the operator can use much of the remaining charge of the discharging battery pack without concern for the limiting process and can maintain working efficiency. On the contrary, when there are no battery packs 41 having a remaining charge level more than or equal to the second threshold, because the electric working machine 1 performs the limiting process when a relatively large charge still remains, it is possible to eliminate or reduce the likelihood that the battery packs 41 will suddenly go dead and the electric working machine 1 will suddenly stop.

(Item 4) The electric working machine 1 according to item 1 or 3, wherein the controller 30 is configured or programmed to perform a first process as the limiting process if one or more of the battery packs 41 that are other than the discharging battery pack have a remaining charge level more than or equal to the second threshold, and perform a second process as the limiting process if any of the one or more of the battery packs 41 that are other than the discharging battery pack do not have a remaining charge level more than or equal to the second threshold, the second process being a process to limit electricity supplied from the discharging battery pack to the actuated device E to a greater extent than the first process.

With the electric working machine 1 according to item 4, it is possible to reduce consumption of electricity more reliably when any of the battery packs 41 do not have a remaining charge level more than or equal to the second threshold, compared to when one or more of the battery packs 41 have a remaining charge level more than or equal to the second threshold. On the other hand, it is possible to reduce a decrease in working efficiency even if the remaining charge level of the discharging battery pack is low, to a greater extent when one or more of the battery packs 41 have a remaining charge level more than or equal to the second threshold than when any of the battery packs 41 do not have a remaining charge level more than or equal to the second threshold. This makes it possible to use the remaining charge of the battery packs 41 appropriately.

(Item 5) The electric working machine 1 according to item 4, wherein the actuated device E includes an electric motor 46, and the controller 30 is configured or programmed to perform the limiting process to limit an upper limit of a rotational speed of the electric motor 46, and set the upper limit of the rotational speed such that the upper limit is lower in the second process than in the first process.

With the electric working machine 1 according to item 5, when one or more of the battery packs 41 have a remaining charge level more than or equal to the second threshold, it is possible to use a large amount of electricity before the limiting process is performed, and it is possible to prevent or reduce a decrease in power generated by the electric motor 46. On the other hand, when any of the battery packs 41 do not have a remaining charge level more than or equal to the second threshold, it is possible to more reliably reduce consumption of electricity of the discharging battery pack by setting the upper limit of the rotational speed to a small value.

(Item 6) The electric working machine 1 according to item 4 or 5, wherein the actuated device E includes a working device 20 and a traveling device 10, and the controller 30 is configured or programmed to limit driving of the working device 20 and/or the traveling device at least in the second process.

With the electric working machine 1 according to item 6, it is possible to limit supply of electricity more reliably when any of the battery packs 41 do not have a remaining charge level more than or equal to the second threshold than when one or more of the battery packs 41 have a remaining charge level more than or equal to the second threshold.

(Item 7) The electric working machine 1 according to item 6, wherein the controller 30 is configured or programmed to prohibit the driving of the working device 20 and not prohibit the driving of the traveling device 10 in the second process.

With the electric working machine 1 according to item 7, it is possible to limit supply of electricity more reliably when any of the battery packs 41 do not have a remaining charge level more than or equal to the second threshold than when one or more of the battery packs 41 have a remaining charge level more than or equal to the second threshold. Moreover, the electric working machine 1 can travel even when the second process is being performed, because driving of the traveling device 10 is not limited in the second process. Therefore, even when the controller 30 is performing the second process, the electric working machine 1 can move to a location where the battery packs 41 are to be charged.

(Item 8) The electric working machine 1 according to any one of items 4 to 7, further including an operator's seat 4 on which an operator is to be seated, wherein the actuated device E includes an air conditioner 55 to condition air around the operator's seat 4, and the controller is configured or programed to limit electricity supplied from the discharging battery pack to the air conditioner 55 to a greater extent in the second process than in the first process.

With the electric working machine 1 according to item 8, it is possible to limit supply of electricity more reliably when any of the battery packs 41 do not have a remaining charge level more than or equal to the second threshold than when one or more of the battery packs 41 have a remaining charge level more than or equal to the second threshold.

(Item 9) The electric working machine 1 according to any one of items 1 and 3 to 8, further including an operation actuator 5*f* to receive a cancelling operation to cancel the limiting process, wherein the controller 30 is configured or programmed to cancel the limiting process based on an operation signal indicating the cancelling operation output from the operation actuator 5*f*.

With the electric working machine 1 according to item 9, even when electricity supplied by the discharging battery pack is restricted, an operator can remove the restriction as desired. Therefore, for example, even when the controller 30 is performing the limiting process to limit travel and/or work of the electric working machine 1 and the posture, position, and/or the like of the electric working machine 1 are not appropriate, the operator can cause the electric working machine 1 to move to an appropriate posture, position, and/or the like by operating the operation actuator 5*f*.

(Item 10) The electric working machine 1 according to any one of items 1 and 2 to 9, further including a selector 5*d* to be used to select the discharging battery pack, wherein the controller 30 is configured or programmed to select one of the battery packs 41 as the discharging battery pack based on an operation signal output from the selector 5*d*.

With the electric working machine 1 according to item 10, an operator can change the discharging battery pack by performing a simple action of operating the selector 5*d*.

While preferred embodiments of the present invention have been described above, it is to be understood that variations and variations will be apparent to those skilled in the art without departing from the scope and spirit of the present invention. The scope of the present invention, therefore, is to be determined solely by the following claims.

In the embodiments described above, example cases where the present invention is applied to the electric working machine 1 such as a backhoe are described. However, the present invention is applicable not only to the electric working machine 1 such as a backhoe but also to, for example, construction machines such as a wheel loader, a compact track loader, and a skid-steer loader, as well as agricultural machines such as a tractor, a combine, a rice transplanter, and a mower.

What is claimed is:

1. An electric working machine comprising:
   battery packs;
   an actuated device to be actuated by electricity supplied from the battery packs; and
   a controller to control discharging of the battery packs based on a remaining charge level of each of the battery packs; wherein
   the controller is configured or programmed to:
      select one of the battery packs as a discharging battery pack to supply electricity to the actuated device, and perform a limiting process to limit electricity supplied from the discharging battery pack to the actuated device when the remaining charge level of the discharging battery pack is less than a limit threshold; and
      cause the limit threshold and/or content of the limiting process to differ between when one or more of the battery packs that are other than the discharging battery pack have a remaining charge level more than or equal to a second threshold and when any of the one or more of the battery packs that are other than the discharging battery pack do not have a remaining charge level more than or equal to the second threshold.

2. The electric working machine according to claim 1, wherein
   the controller is configured or programmed to:
      set the limit threshold to a first threshold that is less than the second threshold if one or more of the battery packs that are other than the discharging battery pack have a remaining charge level more than or equal to the second threshold; and
      set the limit threshold to the second threshold or to a third threshold that is more than the first threshold and less than or equal to the second threshold if any of the one or more of the battery packs that are other than the discharging battery pack do not have a remaining charge level more than or equal to the second threshold.

3. The electric working machine according to claim 1, wherein
the controller is configured or programmed to:
perform a first process as the limiting process if one or more of the battery packs that are other than the discharging battery pack have a remaining charge level more than or equal to the second threshold; and
perform a second process as the limiting process if any of the one or more of the battery packs that are other than the discharging battery pack do not have a remaining charge level more than or equal to the second threshold, the second process being a process to limit electricity supplied from the discharging battery pack to the actuated device to a greater extent than the first process.

4. The electric working machine according to claim 3, wherein
the actuated device includes an electric motor; and
the controller is configured or programmed to:
perform the limiting process to limit an upper limit of a rotational speed of the electric motor; and
set the upper limit of the rotational speed such that the upper limit is lower in the second process than in the first process.

5. The electric working machine according to claim 3, wherein
the actuated device includes a working device and a traveling device; and
the controller is configured or programmed to limit driving of the working device and/or the traveling device at least in the second process.

6. The electric working machine according to claim 5, wherein the controller is configured or programmed to prohibit the driving of the working device and not prohibit the driving of the traveling device in the second process.

7. The electric working machine according to claim 3, further comprising:
an operator's seat on which an operator is to be seated; wherein
the actuated device includes an air conditioner to condition air around the operator's seat; and
the controller is configured or programed to limit electricity supplied from the discharging battery pack to the air conditioner to a greater extent in the second process than in the first process.

8. The electric working machine according to claim 1, further comprising:
an operation actuator to receive a cancelling operation to cancel the limiting process; wherein
the controller is configured or programmed to cancel the limiting process based on an operation signal indicating the cancelling operation output from the operation actuator.

9. The electric working machine according to claim 1, further comprising:
a selector to be used to select the discharging battery pack; wherein
the controller is configured or programmed to select one of the battery packs as the discharging battery pack based on an operation signal output from the selector.

10. A method of controlling an electric working machine including battery packs and an actuated device to be actuated by electricity supplied from the battery packs, the method comprising:
a first step including detecting a remaining charge level of each of the battery packs;
a second step including selecting one of the battery packs as a discharging battery pack to supply electricity to the actuated device; and
a third step including performing a limiting process to limit electricity supplied from the discharging battery pack to the actuated device when the remaining charge level of the discharging battery pack of the battery packs is less than a limit threshold; wherein
the third step includes causing the limit threshold and/or content of the limiting process to differ between when one or more of the battery packs that are other than the discharging battery pack have a remaining charge level more than or equal to a second threshold and when any of the one or more of the battery packs that are other than the discharging battery pack do not have a remaining charge level more than or equal to the second threshold.

* * * * *